Dec. 30, 1958

C. J. KEMP 2,866,393

BOX FOLDING EQUIPMENT

Filed Feb. 3, 1955

INVENTOR
Clayton J. Kemp
BY
ATTORNEYS.

Dec. 30, 1958

C. J. KEMP 2,866,393

BOX FOLDING EQUIPMENT

Filed Feb. 3, 1955

INVENTOR
Clayton J. Kemp
BY
ATTORNEYS.

Dec. 30, 1958
C. J. KEMP
2,866,393
BOX FOLDING EQUIPMENT
Filed Feb. 3, 1955
10 Sheets-Sheet 4
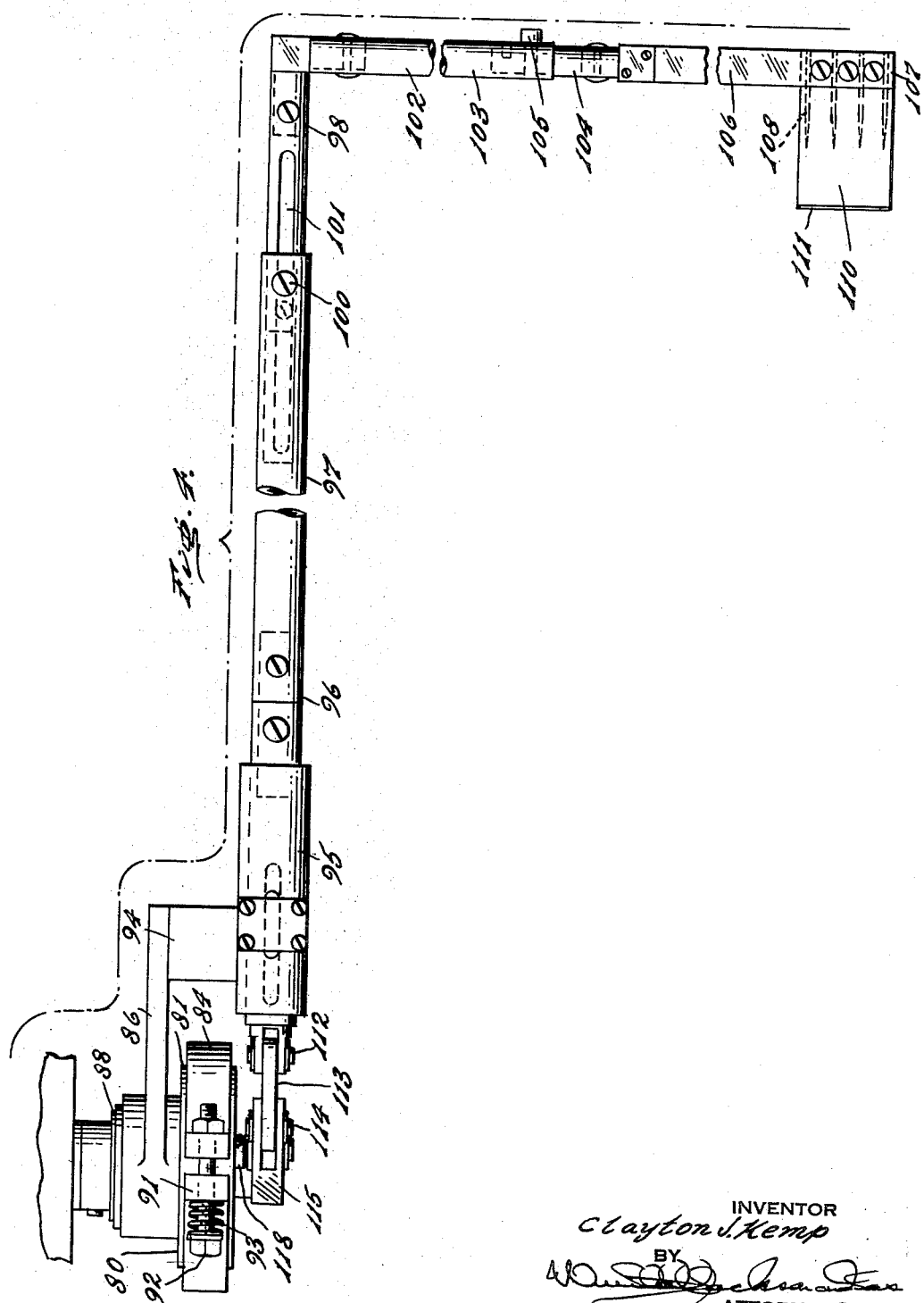
INVENTOR
Clayton J. Kemp
BY
ATTORNEYS.

Dec. 30, 1958 C. J. KEMP 2,866,393
BOX FOLDING EQUIPMENT
Filed Feb. 3, 1955 10 Sheets-Sheet 5
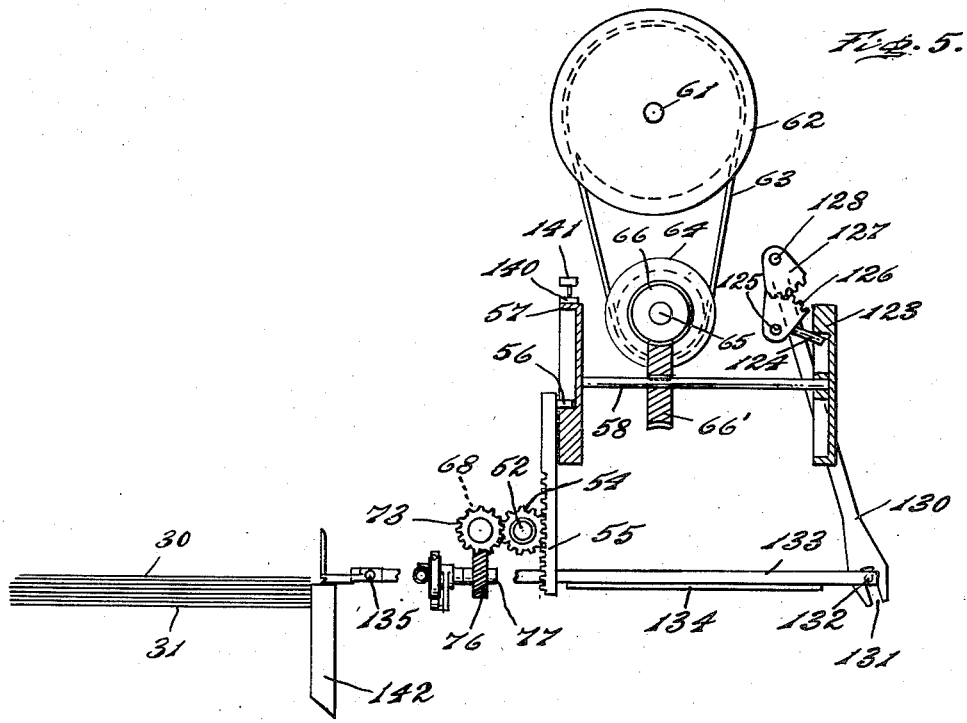
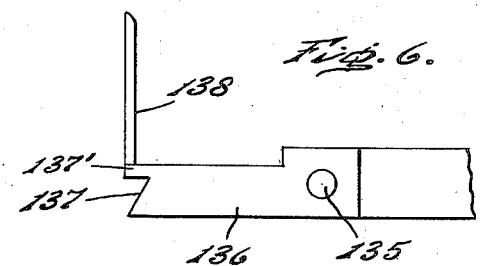
INVENTOR
Clayton J. Kemp
BY
ATTORNEYS.

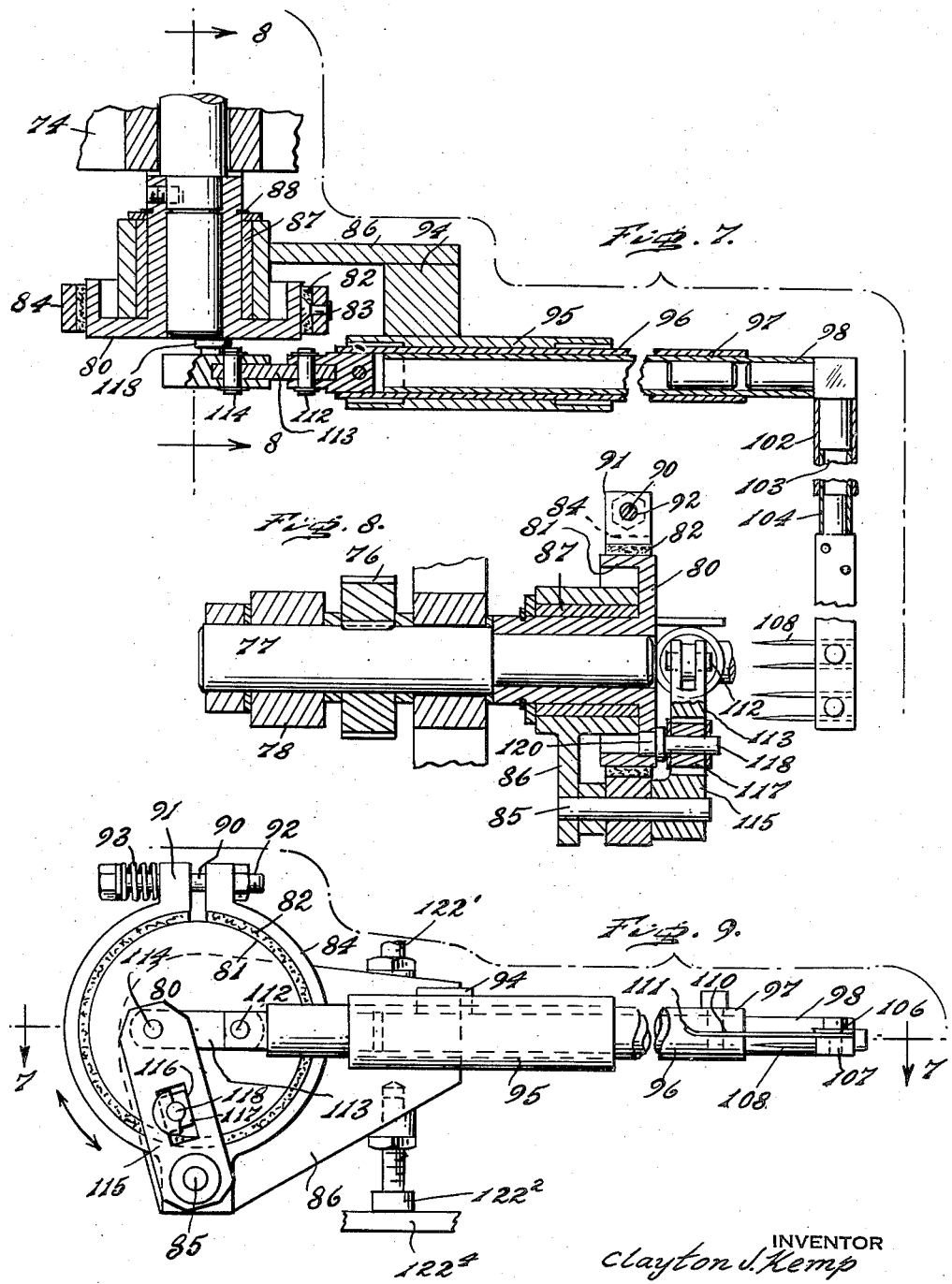

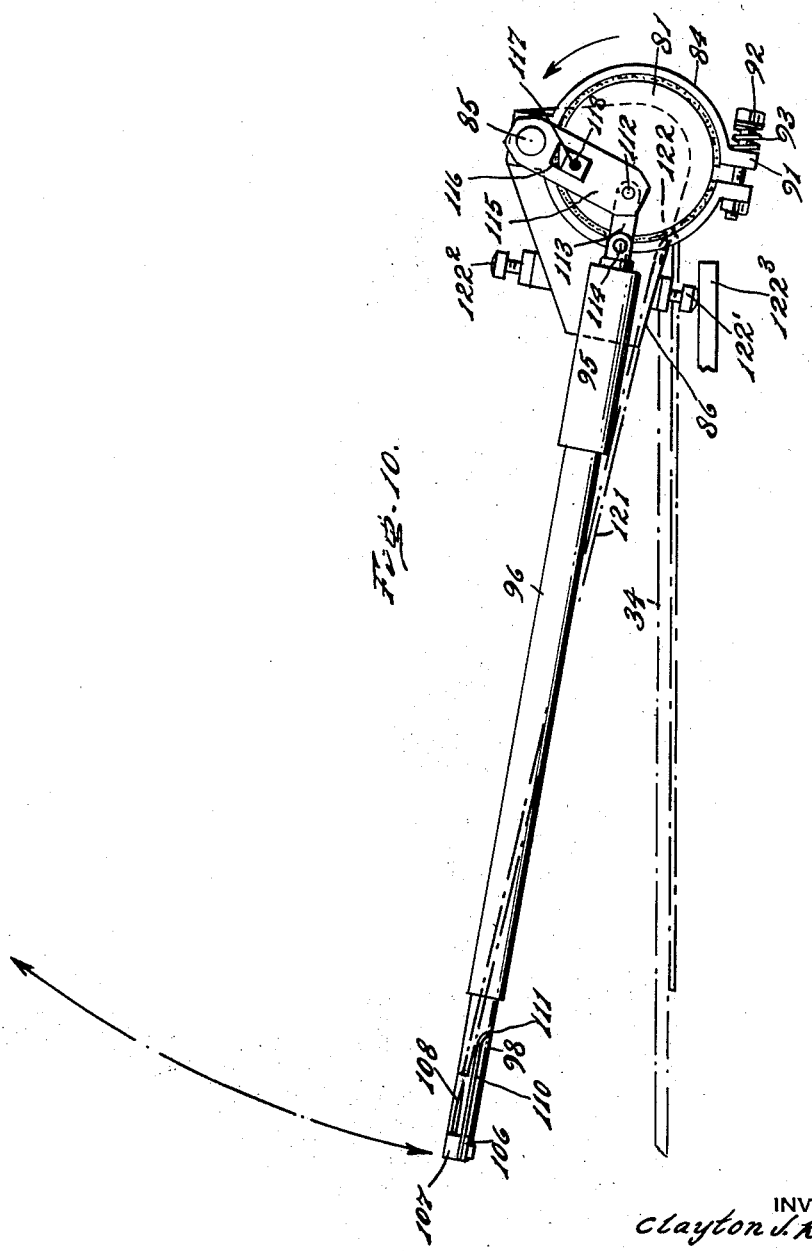

Dec. 30, 1958     C. J. KEMP     2,866,393
BOX FOLDING EQUIPMENT
Filed Feb. 3, 1955     10 Sheets-Sheet 8
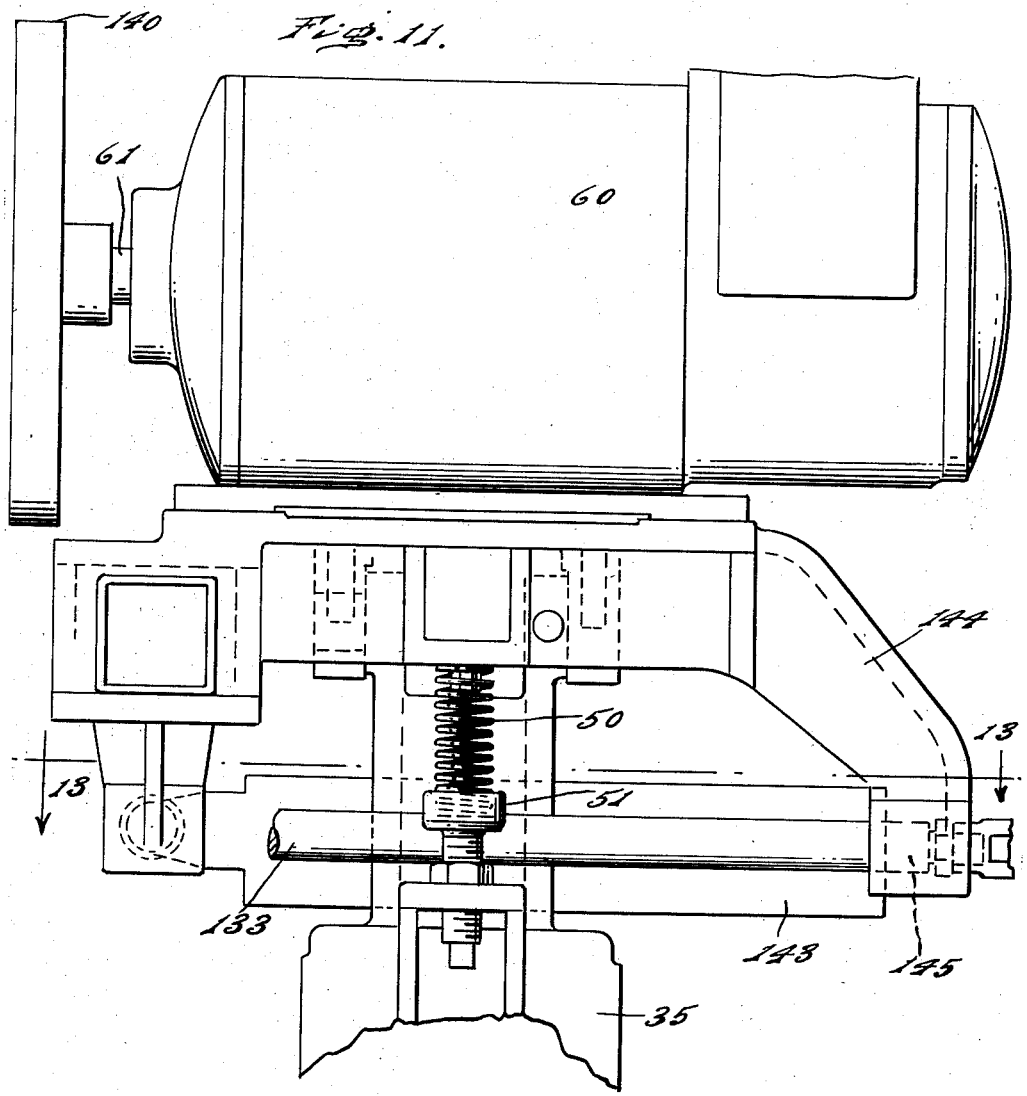
INVENTOR
Clayton J. Kemp
BY
ATTORNEYS.

Dec. 30, 1958   C. J. KEMP   2,866,393
BOX FOLDING EQUIPMENT
Filed Feb. 3, 1955   10 Sheets-Sheet 9
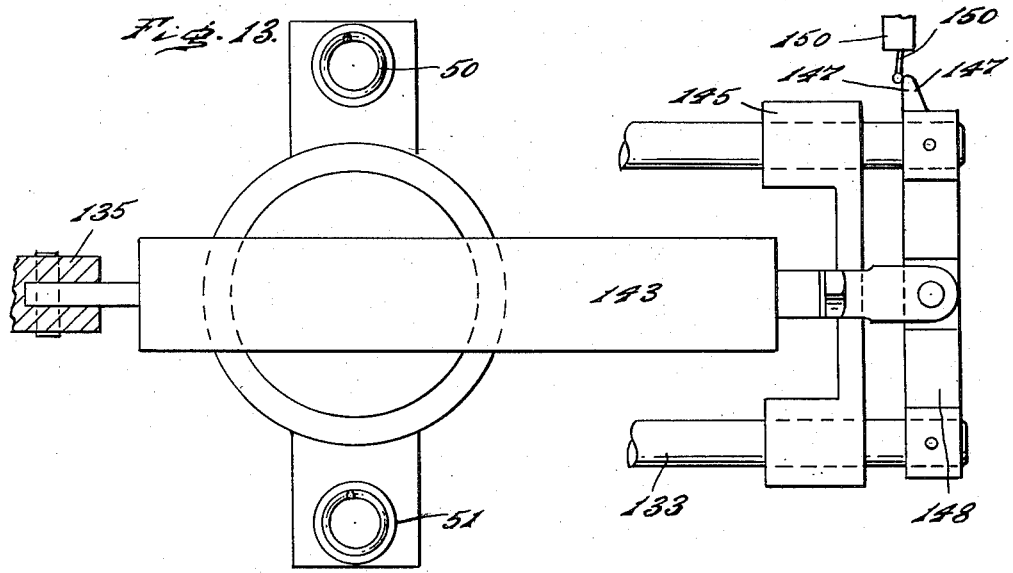
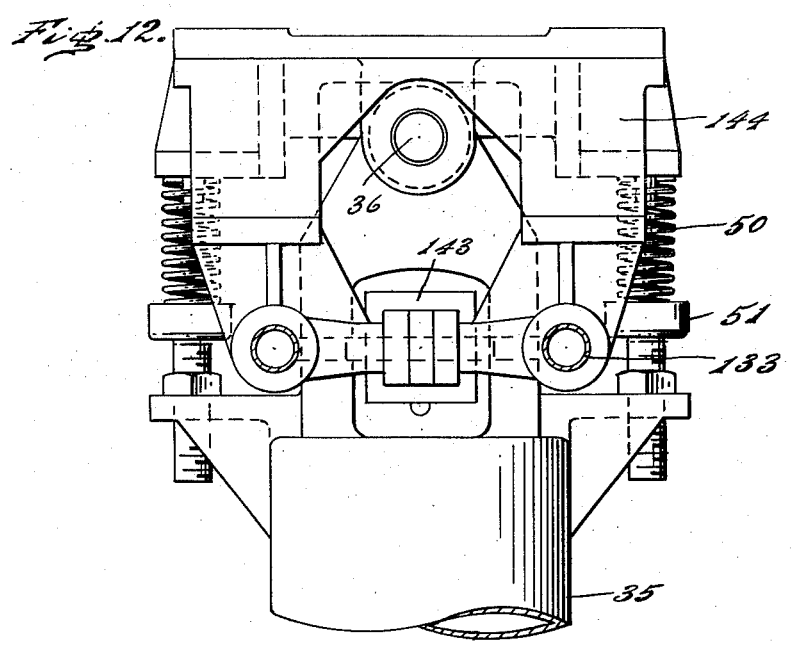
INVENTOR
Clayton J. Kemp.
BY
ATTORNEYS

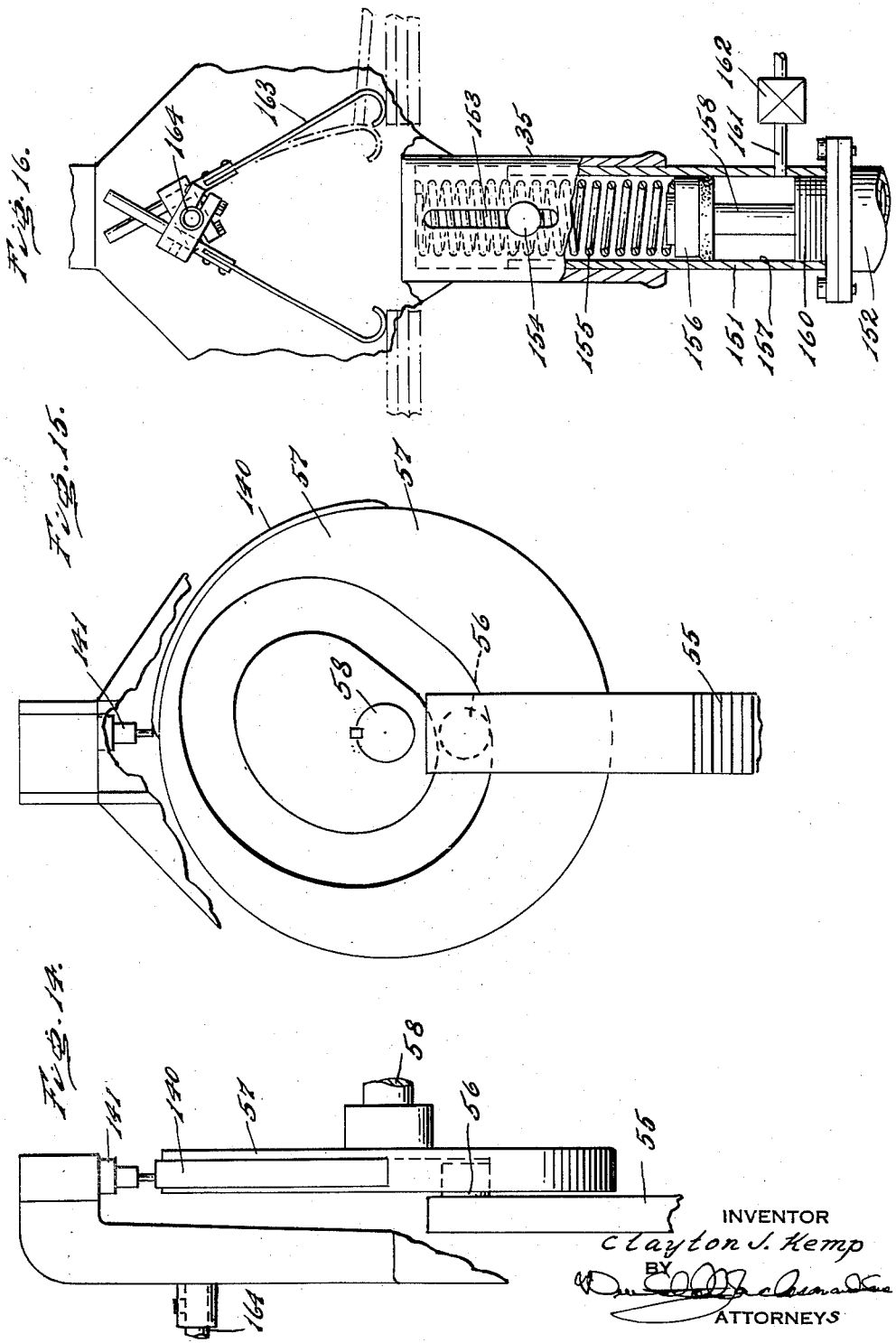

United States Patent Office 2,866,393
Patented Dec. 30, 1958

2,866,393

BOX FOLDING EQUIPMENT

Clayton J. Kemp, Whitefish Bay, Wis.

Application February 3, 1955, Serial No. 485,916

17 Claims. (Cl. 93—49)

The present invention relates to a device for folding corrugated board, particularly of the character employed in blanks for cartons and boxes.

A purpose of the invention is to manipulate corrugated board for folding by pins extending into longitudinal openings of the corrugated board.

A further purpose is to locate pins at the outer end of the folding arm and advance the pins into the end or edge of the corrugated board, swing the arm and then retract the pins.

A further purpose is to locate the pins by a limiter on the outer end of the arm which engages the top of the uppermost blank.

A further purpose is to manipulate the pins radially and swing the arms by mounting each arm in radial guiding relation on a support, pivoting the support coaxially with a brake drum, mounting a brake band on the support surrounding the drum and in resilient engagement with it, pivoting a Scotch yoke at one end on the support, pivotally connecting the other end of the Scotch yoke to the arm, and interconnecting the Scotch yoke intermediate its ends in pivotal and longitudinally guided relation with the brake drum at a position remote from the center.

A further purpose is to manipulate the arm by a shaft which is turned in one direction or the other by a cam, and permissibly to use the shaft to drive the brake drum.

A further purpose is to use opposed folding arms engaging edges on opposite ends of the corrugated board.

A further purpose is to mount the opposed arms on housings which are movable along a frame preferably under the action of opposed screws and preferably to drive the arms by a shaft extending through both housings, and manipulated in opposite directions to move the arms.

A further purpose is to mount foldover arms on the housings.

A further purpose is to pivot the frame between the arms and desirably to bias the frame toward horizontal position.

A further purpose is to adjust the height of the pivot mounting.

A further purpose is to position the frame supporting the folding arms floating on a spring, maintaining an adjustable downward component that will cause the frame to teeter about a horizontal pivot in case the top of the stack is uneven and to fit the stack moving progressively upwardly as blanks are folded and removed.

A further purpose is to provide auxiliary lifting mechanism to raise the folding arm frame abnormally when a new stack of blanks is to be inserted.

A further purpose is to provide a displaceable holddown element which is pushed out of the way by the folded panels of the blank and which holds the blank in folded position.

A further purpose is to push the completed folded blank off the top of the stack by a pushover bar or bars, desirably operated in response to cam mechanism which is suitably interconnected with the cam mechanism for moving the folding arms.

A further purpose is to provide a head pivoted on the forward end of the pusher bar which is movable from a position above the horizontal to a position somewhat below the horizontal and which has a forward prong adapted to engage on the topmost blank and a forward abutment below the prong.

A further purpose is to manipulate the pushover bar mechanically or by fluid operated mechanism.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 4 is an enlarged fragmentary top plan view of one of the folding arms and its operating mechanism.

Figure 5 is a diagrammatic side elevation showing the drive partly in vertical section.

Figure 6 is an enlarged fragment of the forward end of one of the pusher bars of Figure 5.

Figure 7 is an enlarged fragmentary horizontal section of the folding arm and operating mechanism, taken on the line 7—7 of Figure 9.

Figure 8 is a vertical section of Figure 7 on the line 8—8.

Figure 9 is a fragmentary front elevation of one of the folding arms and its operating mechanism.

Figure 10 is a fragmentary front elevation of the folding arm of Figures 1 to 9, with the blank shown in phantom.

Figure 11 is a fragmentary end elevation of a modified form of the invention, using pneumatic operation of the pusher bars.

Figure 12 is a fragmentary front elevation of Figure 11 with the motor removed, and the pusher bar sectioned away.

Figure 13 is a horizontal section of Figure 11 on the line 13—13.

Figure 14 is an enlarged side elevation of one version of the folding arm manipulating cam.

Figure 15 is a front elevation of Figure 14.

Figure 16 is a fragmentary front elevation with the pusher broken away, showing the spring supported and the fluid lifting mechanism for raising the machine and showing the holddown elements.

Figure 1:
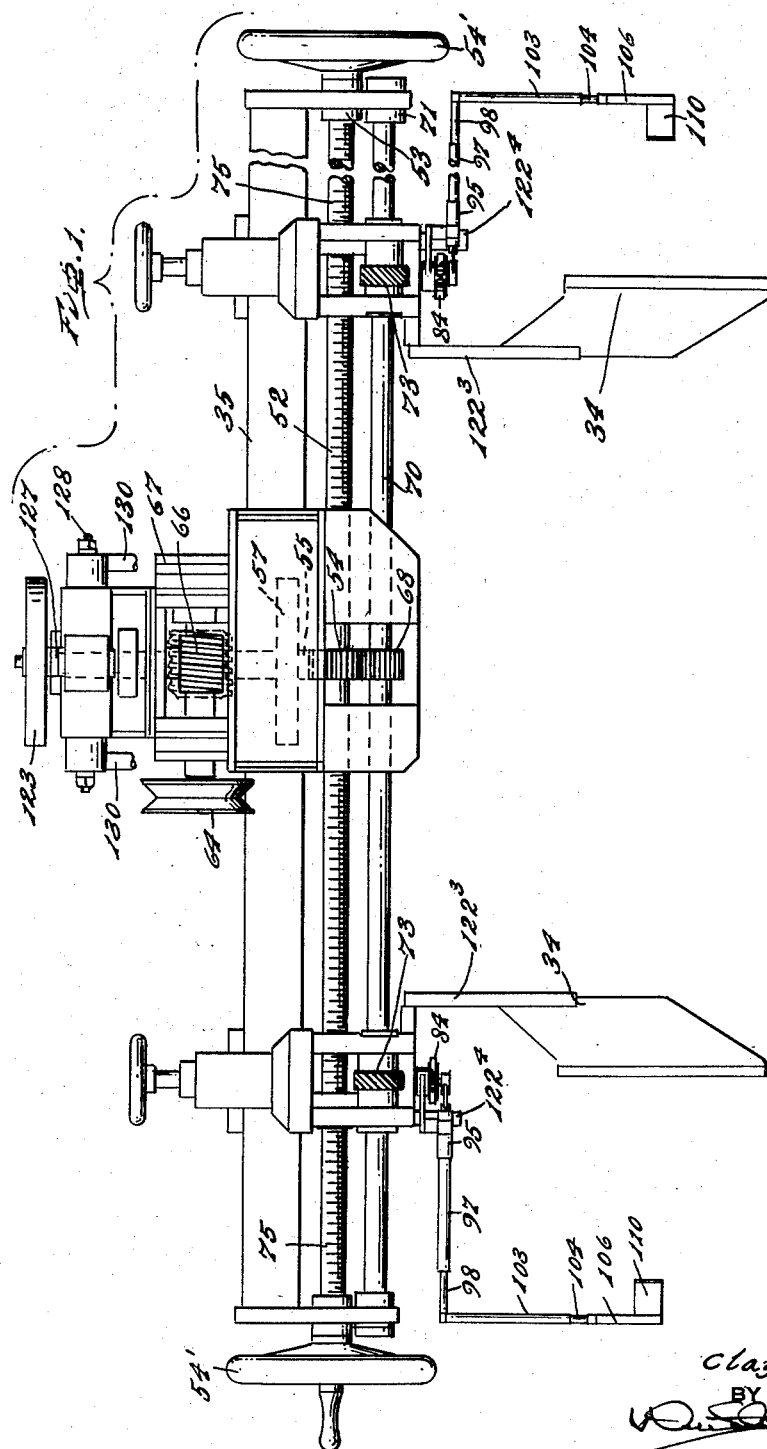
Figure 1 is a top plan view of the folding mechanism of the invention as shown in Figures 1 to 10.

Describing in illustration but not in limitation and referring to the drawings.

Folding machines of the prior art have been employed for folding a box or carton blank prior to stapling or taping, to position the box or blank with two flaps folded adjacent to or against a mid-portion. Difficulty has been had, however, in grasping the blank for this purpose, and accordingly extensive use is made of hand folding to prevent marring the blank.

The present invention is designed to secure positive, reliable and relatively damage-free engagement of a gripping member on the folding arms with the blank. In accordance with the invention, generally parallel extending pins are inserted into the edges or ends of the corrugated blank between the top and bottom surfaces of the corrugated box blank, the fingers or pins are swung by an arm and then the pins are radially withdrawn. In the preferred embodiment, pins extend into one edge or opposed edges of the blank, and are manipulated by advancing them, swinging them and retracting them in order to accomplish the fold.

Any one of a wide variety of mechanism may be used to manipulate the pins, the preferred embodiment being a shaft driven by a cam, a brake drum on the shaft, a support mounted concentric with the brake drum, a radial guide for the shaft on the support, a brake band including frictional material surrounding and in frictional engagement with the brake drum, a Scotch yoke having one end pivotally mounted on the support and another end pivotally interconnected with the end of the arm, and a pivoted and longitudinally guiding connection between the brake drum and the Scotch yoke intermediate its ends. The support is provided with abutments which engage stops in limiting positions and thus assure that overtravel of the shaft will advance or withdraw the pins from the corrugated board.

Thus this mechanism, which is by no means the only mechanism which may be used, advances the pins into the edge or end of the corrugated board, swings the corrugated board and withdraws the pins.

The positioning of the pins with respect to the uppermost blank is desirably secured by a limiter which rests on the top of the uppermost blank and determines the position of the retracted pins with respect to the edge of the blank.

The pin supporting arms and the folding arms are desirably made adjustable, preferably with respect to a frame and suitably by opposed screws engaging housings on which the arms pivot.

The frame is preferably pivoted to teeter on a pivot between the arms.

The frame is desirably floating on a resilient support, preferably a spring, so that there is always a downward component and a vertical adjustment permitted, the downward component assisting in causing the frame to teeter when the top of the stack is uneven.

A further desirable feature is that resilient holddown elements hold the folded panels of the blank in folded position.

A stack of blanks is desirably placed on a jack and the jack is raised to bring the uppermost blank into engagement with the folding arms and the foldover arms. The jack is suitably advanced step by step by the mechanism as each folding cycle is completed.

An adjustment of the frame for height may be and preferably is provided to permit the frame to reach any desired level.

After the folding is completed, the folded blank is desirably carried to a taper or stapler to unite together the adjoining edges. The taper or stapler receives the blank under the action of a pusher bar, which is desirably controlled as by cam means on the shaft which operates the Scotch yoke. The jack is desirably manipulated either directly by cam means which operates the Scotch yoke or by motion of the pushover bar.

The pushover bar desirably has a forward head which is pivoted and free to move from slightly above the horizontal to a position slightly below the horizontal. The head has a forwardly extending prong which rests on the topmost blank and a pushing abutment which engages and pushes the topmost blank.

The stack 30 of box blanks 31 or the like is supported on a platform 32 which is suitably raised or lowered by a fluid actuated jack 33, preferably comprising an air cylinder and ram, which is fluid urged upward and spring returned.

The topmost corrugated box blank 31' rests against a pair of spaced foldover arms 34 which define folds on the blank. The foldover arms are supported (adjustably as later explained) on a frame 35 which is pivoted on a bearing 36 supported on the top of a hollow standard 37 mounted on a suitable base. The bearing 36 is supported on a standard head 38 telescoping on the top of the standard. A pulley 39 is pivoted on a pin 40 extending through the standard, and the ends of the pin extend into a vertical slot 41 on each side of the head. The pulley inside the standard carries cables 42 which at one end extend through vertical slots in the standard (not shown) to anchorages 43 on the standard head, and at the other end extend, after passing over the pulley, to a counterweight 44 inside the standard. Thus the frame 35 can move up and down as well as teeter. The head 38 rests on the top of the standard in inactive position.

The frame 35 compensates for lack of exact horizontal position of the topmost box blank 31' by pivoting around the pivot 36, and resilient mounting is provided by helical compression springs 50 under the frame on either side, which engage in preferably adjustable sockets 51 mounted on bolts on the standard head on either side of the pivot and act against the bottom of the frame.

The frame carries extending longitudinally thereof an adjustment shaft 52 journalled at 53 on the frame at opposite ends, and suitably provided with adjustment handles 54' to make longitudinal manual adjustment as desired.

Figures 2, 5A:
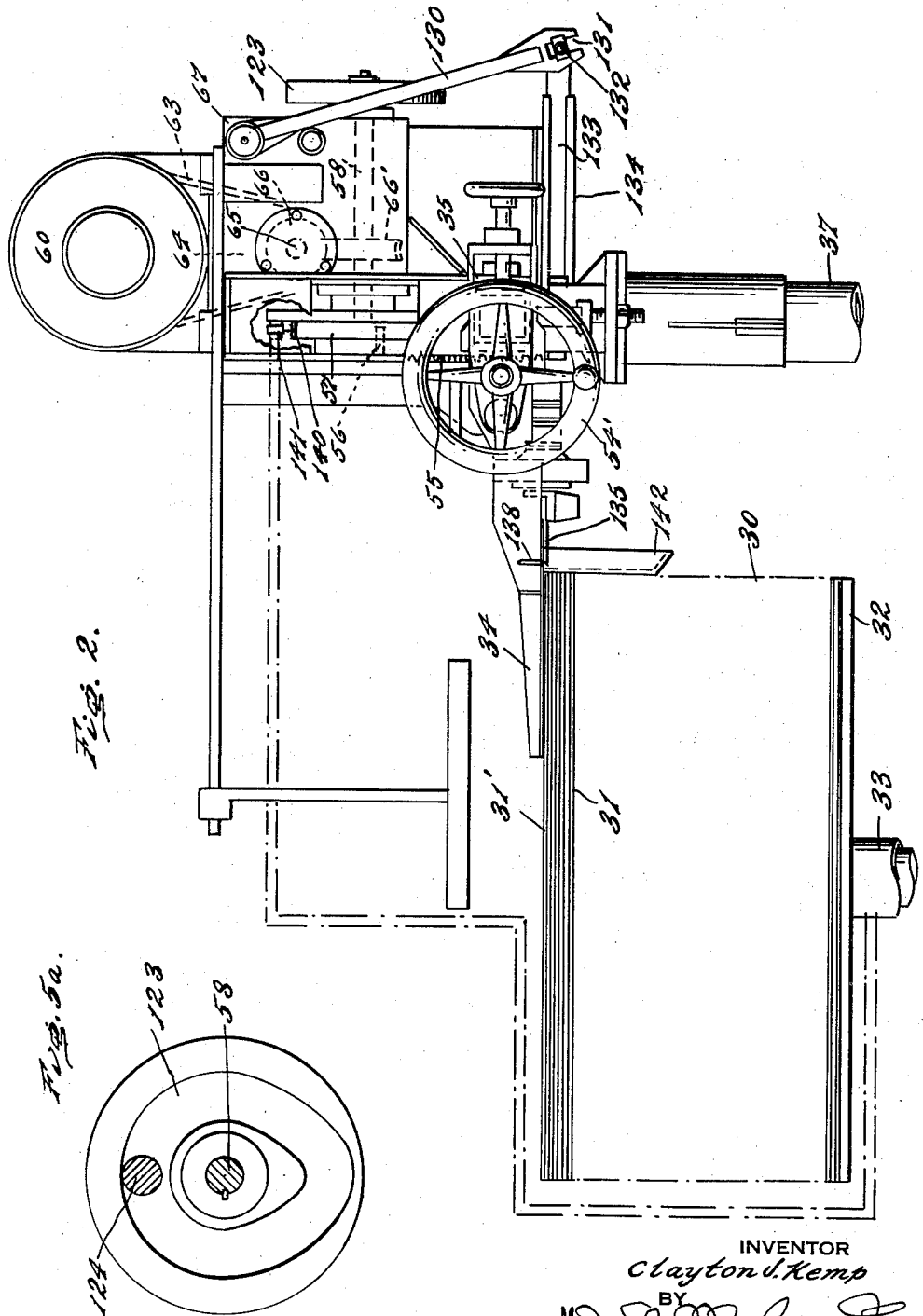
Figure 2 is a side elevation of the mechanism of Figure 1.
Figure 5a is an enlarged fragmentary sectional front view showing the pusher cam and follower.
Figure 3:
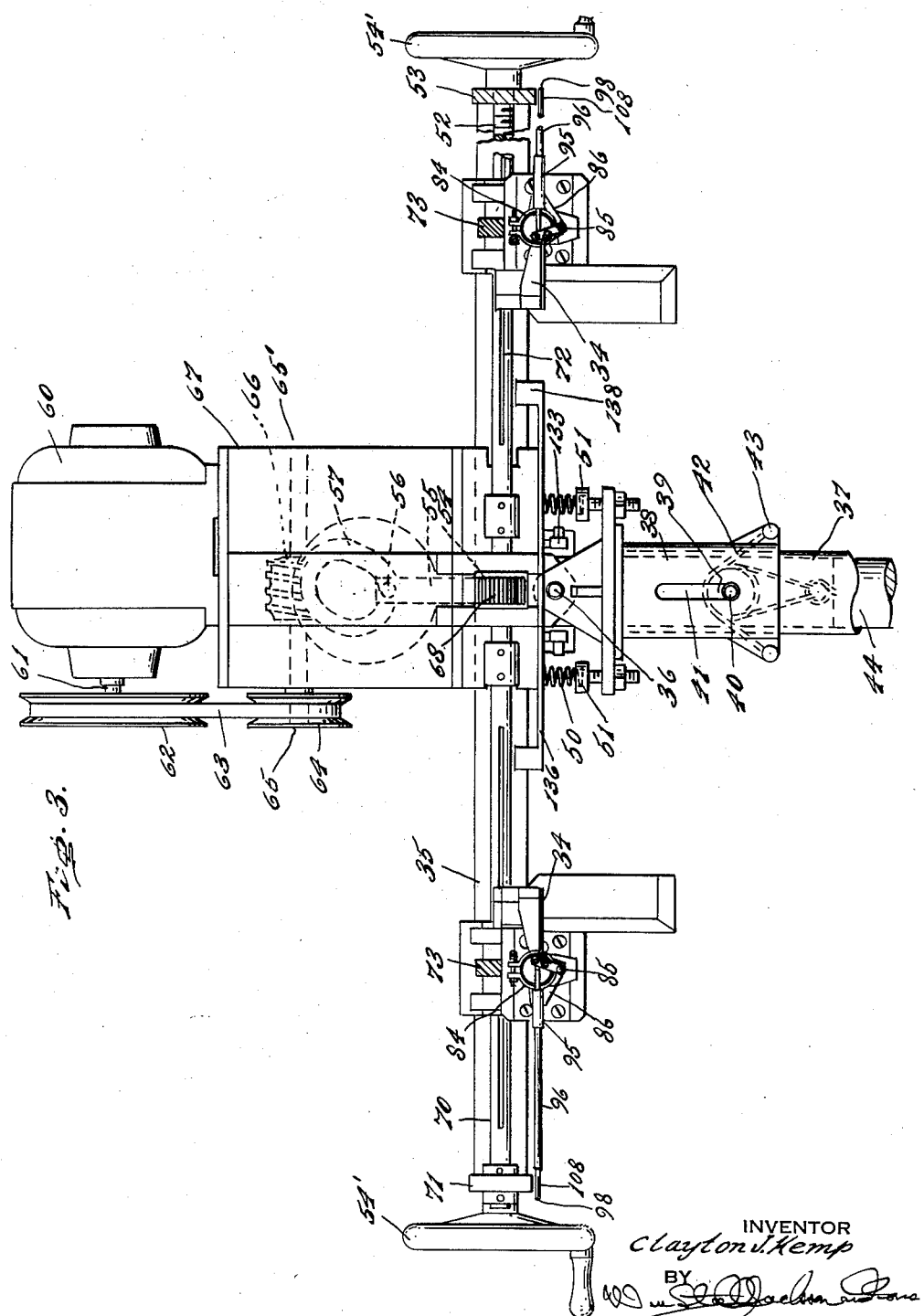
Figure 3 is a front elevation of the mechanism of Figure 1.

The shaft 52 at its midpoint journals a gear 54 free on the shaft which intergears with a rack 55, which is manipulated by follower 56 on internal rim cam 57 turning on cross shaft 58 (Figure 5) on suitable bearings in the frame. The cam is driven in any suitable manner, desirably by an electric motor 60 through motor shaft 61, pulley 62, belt 63, pulley 64, and shaft 65 in suitable bearings 65' of gearbox 67. Shaft 65 carries worm 66, which meshes with worm wheel 66' on shaft 58.

Gear 54 which is manipulated by the rack and cam just described, intergears with gear 68 on a shaft 70 extending longitudinally of the frame 35 parallel with the shaft 52. The shaft 70 is journalled in bearings 71 at the ends.

The shaft 70 carries at opposite ends longitudinal splines 72 which engage spline followers on helical gears 73 held laterally in housings 74 which limit the lateral motion of the gears. Each of the housings 74 guides on the frame, and makes threaded engagement with a respectively opposite left-handed or right-handed thread 75 on the shaft 52 so that by turning the handles 54' you can position the gears 73 to place the foldover arms 34 supported on the housings 74 as desired laterally.

Each of helical gears 73 meshes with a helical gear 76 keyed on a cross shaft 77 journalled at 78 on the housing 74. The helical gearing 73, 76 on the two sides is desirably of slightly different gear ratio so that the folding arms will not interfere with one another, but one folding arm will always advance ahead of the other and always retract free from the other. The cross shaft at one end (Figure 8) carries a brake drum 80, which is of concentric cylindrical form, having an exterior brake flange 81, which cooperates with a brake band material 82 which is secured as by rivets 83 to a brake band 84 which is pivotally connected at 85 to a support 86 which is journalled on the brake drum 80 on a spacer bearing 87 held in place by snap ring 88 in a suitable recess.

The brake band at its end remote from the pivot 85 has a separation 90 and carries slotted lugs 91 through which a tensioning bolt 92 extends, the bolt being surrounded between its head and one of the lugs by a helical compression spring 93.

The support 86 and a bracket 94 mount a tubular guide 95 extending radially, and supporting and radially guiding an arm 96 extending through the guide. The arm 96 consists of an inner tubular element 98 and an outer tubular element 97 telescoping, and adjustable by engagement of a locking screw 100 on the outer tubular element 97 into the bottom of a slot 101 on the inner portion 98.

At its outer end each arm 96 carries a cross arm extension 102 rigidly secured thereon and consisting of an outer tubular element 103 and an inner telescoping tubular element 104 which are adjustable by engagement of a locking screw 105 on the outer element against the inner element.

At the outer end of the cross arm 102, there is mounted a spring extension 106, which resiliently adjusts slightly for the height of the top blank and carries a block 107 which mounts engaging pins 108 suitably sharpened at the inner end and intended to extend into the edge of the corrugated board of the box blank.

In the position in which the arms engage the box blank, the pins or prongs 108 are positioned by a limiter 110, suitably a plate extending from the block over the top of the box blank inward beyond the pins and desirably suitably filleted or curved at 111 to guide the lower surface in engagement.

The arm 96 has at its inner end a pivotal connection 112 to a link 113 the opposite end of which pivotally connects at 114 to Scotch yoke 115, the other end of which is pivotally connected at 85 on the support 86. The Scotch yoke 115 intermediate its ends has a longitudinally extending guiding slot 116 which makes guiding engagement with a block 117 which pivotally connects with a pin 118 which is mounted at 120 in the brake drum 80.

The arm goes through a motion which is slightly less than 180° as best seen in Figure 10, the effect being to engage the end of the blank, and then swing the arm through an angle suitably less than 180° to fold over the blank flap at 121 around the edge 122 of the foldover arm 34.

As already explained, the arms do not interfere as they swing back and forth, one moving slightly ahead of the other.

The movement of the pins 108 in and out is accomplished by the Scotch yoke when the support 86 through adjustable abutment 122¹ or 122² on the support engages at 122³ or 122⁴ on stops on the foldover arms.

When the folding has been completed to the degree desired in the machine, to a generally similar angular extent on both of the opposite folds of the blank, the folded blank is pushed off the top of the stack by a suitable pushover mechanism which may desirably consist of a pusher internal track cam 123 on shaft 58 which engages a follower 124 pivoted at 125 and carrying a sector gear 126 which engages a cooperating sector gear 127 pivoted at 128. The sector gear 127 mounts pusher arms 130 which have slots 131 at their outer ends engaging pins 132 on pusher bars 133 guided at 134 on the frame and pushed over the blank. The forward end of the pusher bar 133 pivotally connects at 135 with a pusher contact 136 which has slight freedom on a horizontal axis to drop slightly below the horizontal and has a forward recess 137 which engages the end of the uppermost blank to push it off into a taper or stapler. The pusher bar above the recess has an overhanging lip 137'. The end of the pusher bar may have ears 138.

The cam 57 at a suitable point around its outer circumference carries an additional cam surface 140 which in one position engages and closes an electric switch 141 which is in the operating circuit of the solenoid valve which energizes the pneumatic jack 33 to advance the stack to engage the foldover arms.

The stack is suitably provided with a lateral stop at 142 supported on the frame or on the carton blank stack jack platform.

In the alternative form shown in Figures 11 to 15, the mechanism for making the pins move in and out and swing is identical with that already described.

In this form, however, the cam 57 on its outer circumference 140 engages a switch 141 which at one position of rotation energizes a solenoid valve to admit hydraulic fluid (permissibly air under pressure) to pushover cylinder 143 positioned on bracket 144 on the motor mounting of the frame, and mounting on its piston rod the pusher bars 133 guided at 145 on the frame. The pusher cylinder is spring retracted, although it may permissibly be returned by hydraulic fluid (air) pressure.

As the pusher bars move over, abutment 147 on the pusher bar head 148 engages an electric switch 150 which is in the electric circuit controlling energization of the jack mechanism 33 for the stack.

As best seen in Figure 16, the head 35 which supports the frame telescopes over a tubular guide 151 which extends upward from the top of a pedestal 152. In order to prevent overtravel in either direction, the head 35 is slotted at 153 on each side and a limiting screw 154 on the tubular guide 151 passes through the slot. A helical compression spring 155 acts in the space inside the tubular guide between the top of the head 35 and a piston 156 engaging the bottom of the spring, adapted to move in a fluid cylinder 157 on the inside of the guide. The piston has a rod extension 158 which limits it in downward motion and it is restricted in its downward motion by shims 160 in the bottom of the cylinder. The shims are normally adjusted to raise the piston 156 and compresses the spring 155 to a position at which the weight of the upper structure springs the head 35 down until the limiting screw 154 is about at the middle of the slot 153. The fluid cylinder 157 has a connection 161 through a three-way valve 162 which in one position admits air to raise the piston and raise the head 35 in the frame and in another position exhaust the cylinder to atmosphere.

In operation, a stack of blanks is placed on the jack platform and the valve 162 and is thrown into position which will admit air to the cylinder 157 and raise the entire frame in the preferred embodiment above the normal top of the stack. As soon as the stack is positioned on the jack platform, the cylinder 157 is connected to exhaust and the frame moves down, bringing the machine into normal position. The jack is then raised to urge the stack of blanks forwardly against the foldover arms. If the topmost blank is not horizontal, the frame teeters slightly until the foldover arms rest uniformly on the topmost blank. This action is aided by the floating support of the frame on the spring 155. In case the foldover arms are not properly spaced, the operator should manipulate one of the handles 54 to move the housings together or apart and correspondingly carry the foldover arms and the folding arms.

The machine is then placed in operation by starting the motor to drive the controlling cams or the controlling cam supplemented by the pusher cylinder. As the folding arm controlling cam advances it causes manipulation of the rack 55 to turn the gear 54 and the shaft 70 in the proper direction. As the shaft 70 turns it drives gear 73 to drive gear 76 at each end, thus turning the arm manipulating shaft 77 and applying rotation to the brake drum. The resilient engagement of the brake band material urged by the brake band under the action of spring 93 carries the opposed arms in opposite directions since each of the shafts 77 is oppositely driven by the helical gear connection to the shaft 70.

Actually, considering the arm in Figure 9, the cam 57 turns the brake drum 80 clockwise until the abutment 122² engages the stop 122⁴, at which time the limiter 110 rests on the top of the corrugated board topmost blank, and the pins 108 extend toward the edge of the corrugated board but slightly beyond the end of the corrugated board blank. Further motion of the brake drum 80 clockwise tends to pull the pins 108 into the edge of the corrugated board topmost blank. Now the cam 57 reverses the drive of the rack and drives the brake drum counterclockwise. Initially the folding arm 95 swings counterclockwise along with the outer flap of the blank, until the fold being made around the foldover arm has been completed to the desired angle. The angle need not be 180 degrees, but may be something less, for example 165 degrees, or any other predetermined angle. At this point the abutment 122' on the support 80 engages the stop 122³ on the housing, and at this point swinging movement of the arm ceases in that direction. Further movement of the brakedrum now tends to retract the pins 108 by the action of pivot pin 118 on the Scotch yoke, releasing the end of the folded flap. The folding action having produced a permanent deformation of the carbon material, the flap remains approximately in the folded position.

In swinging over to folded position the float encounters resilient holddown elements 163 mounted on bracket 164 from the frame of the machine preferably at the cam housing. The holddown elements are suitable springs which are deflected out of the way as the flap passes and then spring back and engage to hold the flap in position.

At this point the pusher bar is energized either by the cam 123 to push the blank off through the mechanical mechanism or else by the action of cam 140 to close switch 141 to operate the pusher cylinder.

Now, when the cam 57 moves the rack in the direction to turn the brakedrum clockwise in Figure 9, the arm, with the pins retracted, swings clockwise and eventually the limiter 110 comes into engagement with the next blank at the edge, and the abutment 122² engages the stop 122⁴ to begin the next cycle by moving the pins into the edge of the corrugated board of the next blank.

In the preferred embodiment, the top of the stack is always kept at the same level by the action of the jack which, after each folded blank is pushed off, forces the stack up against the foldover arms. This is accomplished by switch 141 in one embodiment or switch 150 in the other embodiment.

When the last of a stack has been discharged, valve 162 is adjusted to raise the frame bodily above the jack platform. The jack platform is then lowered by controlling the jack and a new stack is then placed in position on the jack platform.

It will be evident that what has just been described in reference to the motion of one arm is taking place in opposite counterpart relationship, but in synchronism on the other arm, so that the arms act in unison. Of course the invention is applicable to mechanism employing any suitable number of arms, each usually engaging a different flap.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In folding mechanism for corrugated board a folding arm, pins on the outer end of the arm directed toward the edge of the corrugated board and mechanism for moving the pins into the edge in the plane of the corrugated board to insert the pins in the board parallel to said plane, swinging the arm to fold the board and retracting the pins from the edge by motion in the plane of the adjoining portion of the corrugated board, said mechanism comprising a shaft, cam means for selectively turning the shaft in one direction or another at different times on the cycle, a brake drum on the shaft, a support pivotally mounted coaxially with the brakedrum, a guide on the support guiding the arm for radial motion, a brakeband pivotally mounted on the support and including brakeband material, means for urging the brakeband into gripping engagement with the brakedrum, a Scotch yoke pivoted on the support and pivotally interconnected with the arm, guide means pivoting the Scotch yoke intermediate its ends on the brakedrum and guiding the Scotch yoke for longitudinal motion, and stop means for limiting the support in opposite motions.

2. In folding mechanism for corrugated board, a folding arm, pins on the outer end of the arm directed toward the edge of the corrugated board, mechanism for moving the pins into the edge in the plane of the corrugated board to insert the pins in the board parallel to said plane, mechanism for swinging the arm, mechanism for retracting the pins from the edge by motion in the plane of the adjoining portion of the corrugated board, a housing movable along the corrugated board, screws means for advancing and retracting the housing, and pivotal means for mounting the housing, the mechanism for advancing and retracting the pins and swinging the arm being mounted on the housing.

3. In folding mechanism for corrugated board, a pair of opposed folding arms, pins at the outer end of each arm directed toward the adjoining edge of the corrugated board, mechanism for moving the pins into said adjoining edge in the plane of the corrugated board to insert the pins in the board parallel to said plane, mechanism for swinging the arms, mechanism for retracting the pins from each of said adjoining edges by motion in the plane of the adjoining portion of the corrugated board, longitudinally extending opposed screw means extending along the corrugated board, housings in threaded engagement with the screw means, pivotal means on the housings for mounting the arms, and mechanism common to both housings for driving the arms at any adjusted position along the screw means, said mechanism for advancing, retracting and swinging the pins being mounted on the housings.

4. In folding mechanism for corrugated board, a pair of opposed folding arms, pins at the outer end of each arm directed toward the adjoining edge of the corrugated board, mechanism for moving the pins into the edge in the plane of the corrugated board to insert the pins in the board parallel to said plane, mechanism for swinging the arms, and mechanism for retracting the pins from such adjoining edges by motion in the plane of the adjoining portion of the corrugated board, said corrugated board being positioned in a stack, a frame supporting the arms, and a pivotal mounting for the frame intermediate the arms and permitting the frame to assume an inclined position against said stack of corrugated board.

5. In folding mechanism for corrugated board, a pair of opposed folding arms, pins on the outer end of each arm directed toward the adjoining edge of the corrugated board, mechanism for moving the pins into said adjoining edges in the plane of the corrugated board to insert the pins in the board parallel to said plane, mechanism for swinging the arms, mechanism for retracting the pins from such adjoining edges by motion in the plane of the adjoining portion of the corrugated board, a frame supporting the arms, a pivotal mounting of the frame intermediate between the arms, and opposed spring means biasing the frame toward horizontal position.

6. In folding mechanism for corrugated board, a pair of opposed folding arms, pins on the outer end of each folding arm directed toward the adjoining edge of the corrugated board, mechanism for moving the pins into the edge in the frame of the corrugated board to insert pins in the board parallel to said plane, mechanism for swinging the arms, mechanism for retracting the pins from such adjoining edges by motion in the plane of the adjoining portion of the corrugated board, the corrugated board being positioned in a stack, a frame supporting the arms, a pivotal mounting for the frame intermediate the arms and permitting the frame to assume an inclined position against said stack of corrugated board, and means for raising and lowering the pivotal mounting.

7. In folding mechanism for corrugated board, a folding board, a folding arm, pins on the outer end of the arm directed toward the edge of the corrugated board, mechanism for moving the pins into the edge in the plane of the corrugated board to insert the pins in the board parallel to said plane, mechanism for swinging the arm, mechanism for retracting the pins from the edge by motion in the plane of the adjoining portion of the corrugated board, the corrugated board being positioned in a stack and the topmost corrugated board element forming a folded blank, and pusher means acting on the folded corrugated board blank, adapted to push the same off the stack.

8. Folding mechanism according to claim 7, in combination with a lip on the front of the pusher means having freedom to move from the position above the horizontal to a position below the horizontal and having a protrusion which engages around the topmost blank, and an abutment which is in line to position the topmost blank.

9. In folding mechanism for corrugated board of the type which has interior parallel passages running transverse to an edge of the board, a folding arm, pins on the outer end of the folding arm insertable into said openings and directed toward said edge of the corrugated board, mechanism for moving the pins straight into the edge in the plane of the corrugated board to insert the pins into said openings, mechanism for swinging the arm while the pins are engaged in the openings and thereby folding the board, and mechanism for retracting the pins from the edge and thereby withdrawing them from the openings by motion in the plane of the adjoining portion of the corrugated board.

10. Folding mechanism of claim 9, in combination with a foldover arm holding the corrugated board along the fold line.

11. Folding mechanism of claim 9, in combination with a limiter on the outer end of the folding arm adjacent the pins, extending beyond the pins in the direction in which the pins extend toward the corrugated board, and positioning the pins with respect to the plane of the openings in the corrugated board so that the pins enter the openings.

12. Folding mechanism of claim 9, the corrugated board being positioned in a stack, in combination with spring means supporting the folding mechanism in floating position so that it is free to move horizontally up and down and resiliently urging the folding mechanism down against the top of the stack to compensate for varying positional relationships of the top of the stack.

13. Folding mechanism of claim 12, in combination with fluid means for urging the spring means upwardly and thereby raising the folding mechanism bodily while it remains floating on the spring means and engaging the top of the stack.

14. Folding mechanism of claim 9, in combination with cam means controlling the operation of the pins, and means controlled by the cam means for raising a stack of blanks into position to be engaged by the folding arm.

15. In folding mechanism for corrugated board having a plurality of parallel openings extending through the interior of the board transverse to an edge, opposed folding arms at edges to which the openings are transverse, pins at the outer ends of the arms directed toward said edges and adapted to enter the openings in the corrugated board, mechanism for moving the pins straight into the edges in the plane of the corrugated board to insert the pins into the openings, mechanism for swinging the arms while the pins remain in the openings, and mechanism for retracting the pins from the edges by motion in the plane of the adjoining portion of the corrugated board.

16. Folding mechanism of claim 15, in combination with a limiter mounted on each arm and engaging the corrugated board at a position at which the pins are retracted so as to align the pins with respect to the openings in the corrugated board.

17. Folding mechanism of claim 15, in which the corrugated boards are positioned in the form of a stack, in combination with cam means responsive to the motion of the folding arms, and pusher mechanism controlled by the cam means to push the topmost corrugated blank off the stack.

References Cited in the file of this patent

UNITED STATES PATENTS

| | | |
|---|---|---|
| 1,713,644 | Davis | May 21, 1929 |
| 2,520,322 | Mestre | Aug. 29, 1950 |
| 2,609,736 | Montgomery | Sept. 9, 1952 |
| 2,682,400 | Lukey | June 29, 1954 |